(12) United States Patent
Aflaki Beni

(10) Patent No.: US 11,010,923 B2
(45) Date of Patent: May 18, 2021

(54) IMAGE ENCODING METHOD AND TECHNICAL EQUIPMENT FOR THE SAME

(71) Applicant: Nokia Technologies Oy, Espoo (FI)

(72) Inventor: Payman Aflaki Beni, Tampere (FI)

(73) Assignee: Nokia Technologies Oy, Espoo (FI)

( * ) Notice: Subject to any disclaimer, the term of this patent is extended or adjusted under 35 U.S.C. 154(b) by 202 days.

(21) Appl. No.: 16/306,980

(22) PCT Filed: May 24, 2017

(86) PCT No.: PCT/FI2017/050388
§ 371 (c)(1),
(2) Date: Dec. 4, 2018

(87) PCT Pub. No.: WO2017/220850
PCT Pub. Date: Dec. 28, 2017

(65) Prior Publication Data
US 2020/0311978 A1    Oct. 1, 2020

(30) Foreign Application Priority Data
Jun. 21, 2016 (GB) ...................... 1610762

(51) Int. Cl.
*G06K 9/00*    (2006.01)
*G06T 7/80*    (2017.01)
(Continued)

(52) U.S. Cl.
CPC ............. *G06T 7/80* (2017.01); *G06T 7/20* (2013.01); *G06T 9/00* (2013.01); *H04N 19/597* (2014.11)

(58) Field of Classification Search
None
See application file for complete search history.

(56) References Cited

U.S. PATENT DOCUMENTS

| | | |
|---|---|---|
| 6,252,989 B1 | 6/2001 | Geisler et al. |
| 2002/0141650 A1 | 10/2002 | Keeney et al. |

(Continued)

FOREIGN PATENT DOCUMENTS

| | | |
|---|---|---|
| GB | 2545729 A | 6/2017 |
| WO | 2012/148678 A1 | 11/2012 |

(Continued)

OTHER PUBLICATIONS

Cook et al., "Distributed Ray Tracing", Proceedings of the 11th annual conference on Computer graphics and interactive techniques, vol. 18, No. 3, Jul. 1984, pp. 137-145.

(Continued)

*Primary Examiner* — Atiba O Fitzpatrick
(74) *Attorney, Agent, or Firm* — Harrington & Smith

(57) ABSTRACT

The invention relates to a method, an apparatus and a computer program product for encoding multicamera views. The method comprises determining a most probable viewing direction (MPVD) in a content; finding the location of the most probable viewing direction (MPVD) on all available views (View 1-View 8) of the content; defining one or more central locations for each available view (View 1-View 8); determining how the central locations cover the most probable viewing direction (MPVD) on each available view (View 1-View 8), and applying encoding to each view accordingly.

20 Claims, 11 Drawing Sheets

(51) Int. Cl.
H04N 19/597 (2014.01)
G06T 7/20 (2017.01)
G06T 9/00 (2006.01)

(56) References Cited

U.S. PATENT DOCUMENTS

| | | |
|---|---|---|
| 2003/0025652 A1 | 2/2003 | Susnfara et al. |
| 2007/0162922 A1 | 7/2007 | Park |
| 2008/0232701 A1 | 9/2008 | Gering et al. |
| 2011/0255796 A1* | 10/2011 | Nakamura ............ H04N 19/70 382/232 |
| 2012/0319928 A1 | 12/2012 | Rhodes |
| 2013/0182073 A1 | 7/2013 | Yin et al. |
| 2014/0118536 A1 | 5/2014 | Morin et al. |
| 2014/0198838 A1 | 7/2014 | Andrysco et al. |
| 2014/0292751 A1 | 10/2014 | Azar |
| 2014/0341280 A1 | 11/2014 | Yang et al. |
| 2014/0341290 A1 | 11/2014 | Merkle et al. |
| 2015/0109468 A1 | 4/2015 | Laroia |
| 2015/0279418 A1 | 10/2015 | Laksono et al. |

FOREIGN PATENT DOCUMENTS

| | | |
|---|---|---|
| WO | 2015/134400 A1 | 9/2015 |
| WO | 2015/155406 A1 | 10/2015 |
| WO | 2016/014871 A1 | 1/2016 |

OTHER PUBLICATIONS

Gopinathan et al., "Design Considerations for High-Frequency Continuous-Time Filters and Implementation of an Antialiasing Filter for Digital Video", IEEE Journal of Solid-State Circuits, vol. 25, No. 6, Dec. 1990, pp. 1368-1378.
Ji et al., "Real-Time Eye, Gaze, and Face Pose Tracking for Monitoring Driver Vigilance", Real-Time Imaging, vol. 8, No. 5, Oct. 2002, pp. 357-377.
Itti, "Automatic Foveation for Video Compression using a Neurobiological Model of Visual Attention", IEEE Transactions on Image Processing, vol. 13, No. 10, Oct. 2004, pp. 1304-1318.
Shibata, "Head Mounted Display", Displays, vol. 23, No. 1-2, Apr. 2002, pp. 57-64.
Engin et al., "Interactive Transport of Multi-view Videos for 3DTV Applications", Journal of Zhejiang University-Science A, vol. 7, No. 5, 2006, pp. 830-836.
Agrafiotis et al., "Multiple Priority Region of Interest Coding with H.264", 2006 International Conference on Image Processing, Oct. 8-11, 2006, pp. 53-56.
Sato et al., "Visualizing Focus of Attention in Mixed Reality Community Space", Proc. 11th Int. Conf. on Artificial Reality and Telexistence (ICAT), 2001, 6 pages.
Search Report received for corresponding United Kingdom Patent Application No. 1610762.5, dated Dec. 12, 2016, 3 pages.
Search Report received for corresponding United Kingdom Patent Application No. 1610763.3, dated Dec. 12, 2016, 3 pages.
International Search Report and Written Opinion received for corresponding Patent Cooperation Treaty Application No. PCT/FI2017/050388, dated Oct. 9, 2017, 16 pages.
Zhang et al., "Stereoscopic Visual Attention-Based Regional Bit Allocation Optimization for Multiview Video Coding", EURASIP Journal on Advances in Signal Processing, vol. 2010, Article No. 60, 2010, pp. 1-24.
Ekmekcioglu et al., "Visual Attention Model Aided Non-Uniform Asymmetric Coding of Stereoscopic Video", IEEE Journal of Selected Topics in Signal Processing, vol. 8, No. 3, Jun. 2014, pp. 402-414.
Sarkar, "Dynamic Rate Allocation of Interactive Multi-View Video with View-Switch Prediction", Master's Thesis, 2016, pp. 1-58.
Ciubotaru et al., "Objective Assessment of Region of Interest-Aware Adaptive Multimedia Streaming Quality", IEEE Transactions on Broadcasting, vol. 55, No. 2, Jun. 2009, pp. 202-212.
Cheng et al., "Gaze Location Prediction for Broadcast Football Video", IEEE Transactions on Image Processing, vol. 22, No. 12, Dec. 2013, pp. 4918-4929.
International Search Report and Written Opinion received for corresponding Patent Cooperation Treaty Application No. PCT/FI2017/050389, dated Oct. 20, 2017, 15 pages.
Muntean et al., "Region of Interest-Based Adaptive Multimedia Streaming Scheme", IEEE Transactions on Broadcasting, vol. 54, No. 2, Jun. 2008, pp. 296-303.
Extended European Search Report received for corresponding European Patent Application No. 17814813.6, dated Jan. 15, 2020, 10 pages.

\* cited by examiner

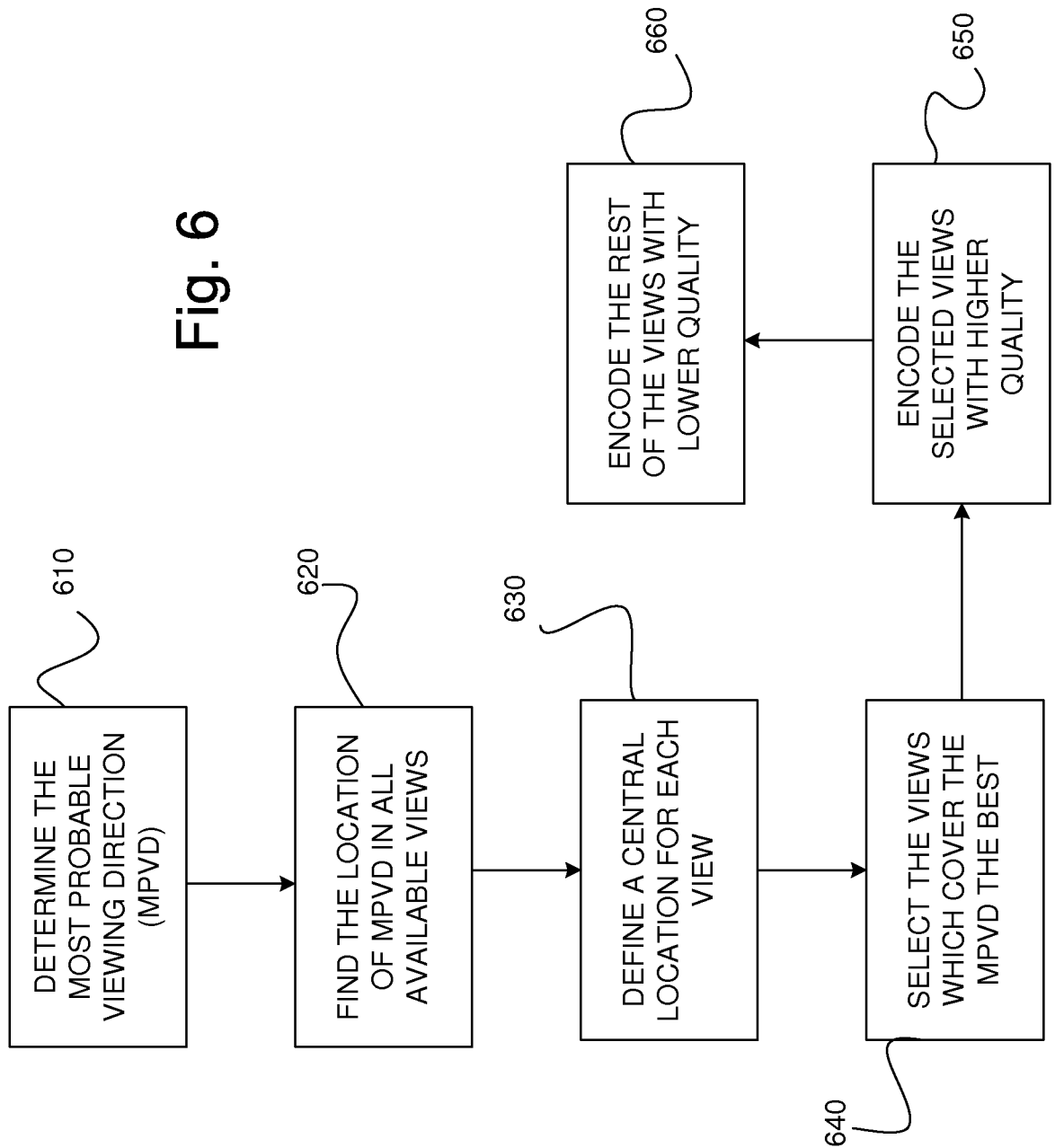

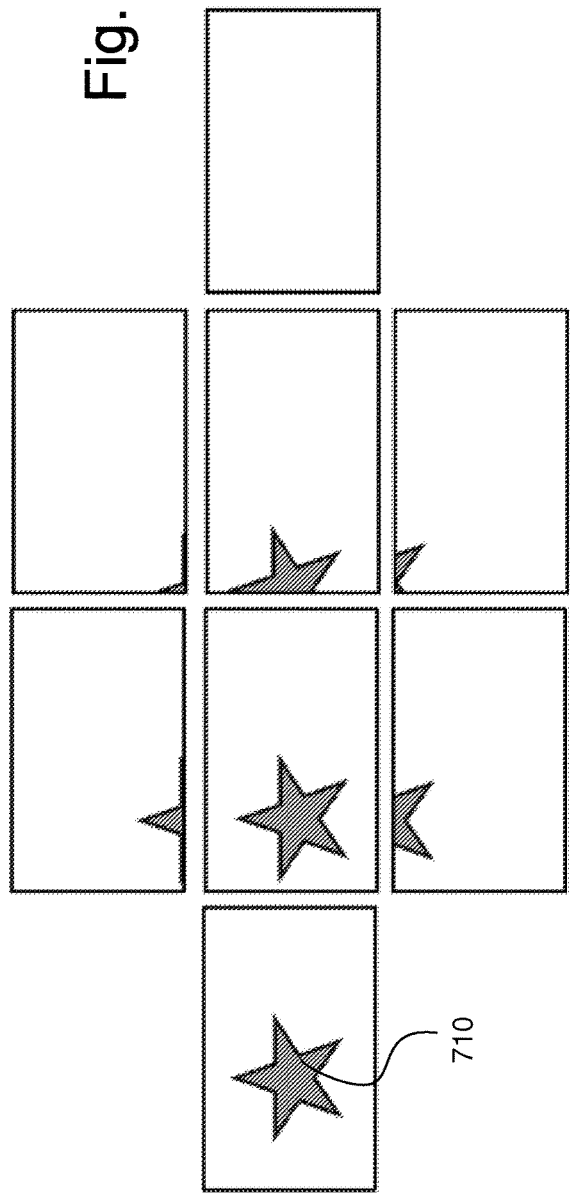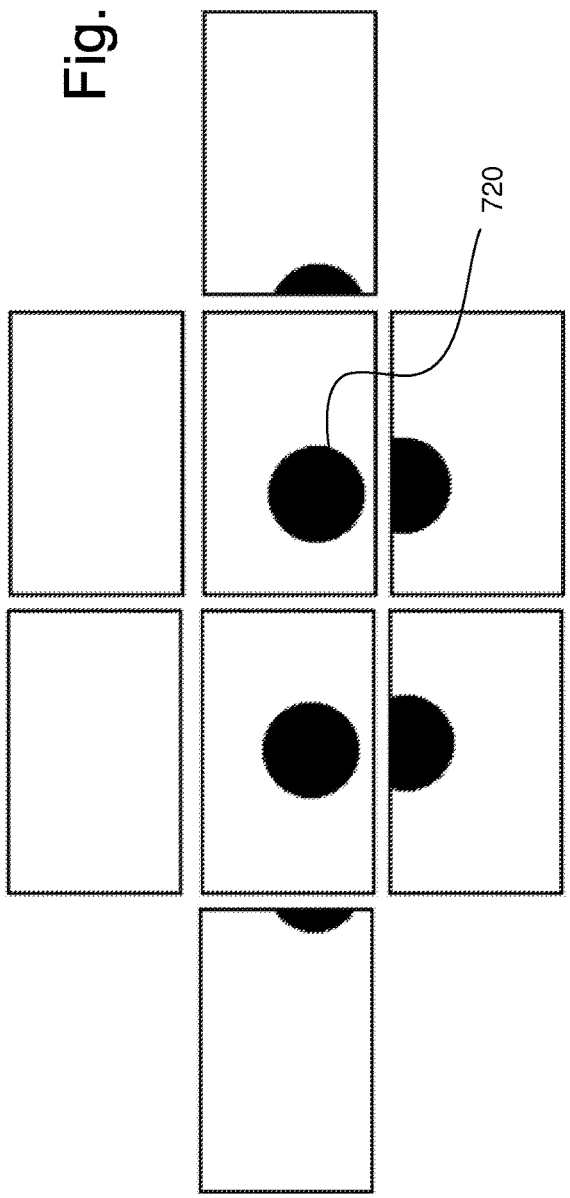

IMAGE ENCODING METHOD AND TECHNICAL EQUIPMENT FOR THE SAME

RELATED APPLICATION

This application was originally filed as PCT Application No. PCT/FI2017/050388 filed May 24, 2017 which claims priority benefit from GB Application No. 1610762.5 filed Jun. 21, 2016.

TECHNICAL FIELD

The present solution generally relates to encoding media content. In particular, the solution relates to a method and technical equipment for reducing bitrate of the media content based on characteristics of the media content.

BACKGROUND

Today's multicamera devices cover different areas of an image simultaneously. The amount of data to be encoded and streamed for multiple views is much higher than the current available broadcasting infrastructure. Hence, it is required to decrease the amount of transmitted data without sacrificing the quality of experience for the users.

SUMMARY

Now there has been invented an improved method and technical equipment implementing the method, for decreasing the amount of the data transmitted. Various aspects of the invention include a method, an apparatus and a computer readable medium comprising a computer program stored therein, which are characterized by what is stated in the independent claims. Various embodiments of the invention are disclosed in the dependent claims.

According to a first aspect, there is provided a method comprising determining a most probable viewing direction in a content; finding the location of the most probable viewing direction on all available views of the content; defining one or more central locations for each available view; determining how the central locations cover the most probable viewing direction on each available view, and applying encoding to each view accordingly.

According to an embodiment, the method further comprises applying highest quality encoding to views where the central locations cover the most probable viewing direction the best.

According to an embodiment, the content is captured with a multi-camera device.

According to an embodiment, the method further comprises defining more than one central location for each view and selecting one or more views based on the relative location of the most probable viewing direction and different central locations.

According to an embodiment, finding the location of the most probable viewing direction on different views is based on one or more of the following: extrinsic and intrinsic parameters of cameras of the multicamera device; physical location of cameras of the multicamera device; direction of cameras of the multicamera device; viewing angle coverage of cameras of the multicamera device; number of cameras of the multicamera device.

According to an embodiment, the content is received through a communication network.

According to an embodiment, the most probable viewing direction is obtained by one or more of the following: determined by a head movement tracker; determined by an eye gaze tracker; received from a content provider; determined by an indication on the amount of movement in the content; determined based on depth information and closeness of the pixels to a viewer.

According to an embodiment, the method further comprises defining the central locations for each view by a certain shape of a certain size.

According to an embodiment, the method further comprises selecting the quality of the encoding based on the relationship of the most probable viewing direction and the central locations.

According to a second aspect, there is provided an apparatus comprising at least one processor, memory including computer program code, the memory and the computer program code configured to, with the at least one processor, cause the apparatus to perform at least the following: determine a most probable viewing direction in a content; find the location of the most probable viewing direction on all available views of the content; define one or more central locations for each available view; determine how the central locations cover the most probable viewing direction on each available view, and apply encoding to each view accordingly.

According to an embodiment the apparatus is further caused to apply highest quality encoding to views where the central locations cover the most probable viewing direction the best.

According to an embodiment the content is captured with a multi-camera device.

According to an embodiment the apparatus is further caused to define more than one central location for each view and selecting one or more views based on the relative location of the most probable viewing direction and different central locations.

According to an embodiment finding the location of the most probable viewing direction on different views is based on one or more of the following: extrinsic and intrinsic parameters of cameras of the multicamera device; physical location of cameras of the multicamera device; direction of cameras of the multicamera device;

viewing angle coverage of cameras of the multicamera device; number of cameras of the multicamera device.

According to an embodiment the content is received through a communication network.

According to an embodiment the most probable viewing direction is obtained by one or more of the following: determined by a head movement tracker; determined by an eye gaze tracker; received from a content provider; determined by an indication on the amount of movement in the content; determined based on depth information and closeness of the pixels to a viewer.

According to an embodiment the apparatus is further caused to define the central locations for each view by a certain shape of a certain size.

According to an embodiment the apparatus is further caused to select the quality of the encoding based on the relationship of the most probable viewing direction and the central locations.

According to a third aspect, there is provided an apparatus comprising means for determining a most probable viewing direction in a content; means for finding the location of the most probable viewing direction on all available views of the content; means for defining one or more central locations for each available view; means for determining how the central locations cover the most probable viewing direction on each available view, and means for applying encoding to each view accordingly.

According to an embodiment the apparatus further comprises means for applying highest quality encoding to views where the central locations cover the most probable viewing direction the best.

According to an embodiment the content is captured with a multi-camera device.

According to an embodiment the apparatus further comprises means for defining more than one central location for each view and selecting one or more views based on the relative location of the most probable viewing direction and different central locations.

According to an embodiment finding the location of the most probable viewing direction on different views is based on one or more of the following: extrinsic and intrinsic parameters of cameras of the multicamera device; physical location of cameras of the multicamera device; direction of cameras of the multicamera device; viewing angle coverage of cameras of the multicamera device; number of cameras of the multicamera device.

According to an embodiment the content is received through a communication network.

According to an embodiment the most probable viewing direction is obtained by one or more of the following: determined by a head movement tracker; determined by an eye gaze tracker; received from a content provider; determined by an indication on the amount of movement in the content; determined based on depth information and closeness of the pixels to a viewer.

According to an embodiment the apparatus further comprises means for defining the central locations for each view by a certain shape of a certain size.

According to an embodiment the apparatus further comprises means for selecting quality of the encoding based on the relationship of the most probable viewing direction and the central locations.

According to a fourth aspect, there is provided a computer program product embodied on a non-transitory computer readable medium, comprising computer program code configured to, when executed on at least one processor, cause an apparatus or a system to: determine a most probable viewing direction in a content; find the location of the most probable viewing direction on all available views of the content; define one or more central locations for each available view; determine how the central locations cover the most probable viewing direction on each available view, and apply encoding to each view accordingly.

DESCRIPTION OF THE DRAWINGS

In the following, various embodiments of the invention will be described in more detail with reference to the appended drawings, in which

FIG. 6 shows a method according to an embodiment;

FIG. 7a, b show presentations of an object in a multi-camera device's content capturing setup;

DESCRIPTION OF EXAMPLE EMBODIMENTS

In the following, several embodiments of the invention will be described in the context of decreasing the amount of data transmitted by decreasing the quality of the multiple views which are not expected to be perceived by the user. It is to be noted, however, that the invention is not limited to this context only.

Also, the present embodiments are discussed in relation to content captured with a multicamera device. A multicamera device has a view direction and comprises a plurality of cameras, at least one central camera and at least two peripheral cameras. Each said camera has a respective field of view, and each said field of view covers the view direction of the multicamera device. The cameras are positioned with respect to each other such that the central cameras and peripheral cameras from at least two stereo camera pairs with a natural disparity and a stereo field of view, each said stereo field of view covering the view direction of the multicamera device. The multicamera device has a central field of view, the central field of view comprising a combined stereo field of view of the stereo camera pairs, and a peripheral field of view comprising fields of view of the cameras at least partly outside the central field of view.

The multicamera device may comprise cameras at locations corresponding to at least some of the eye positions of a human head at normal anatomical posture, eye positions of the human head at maximum flexion anatomical posture, eye positions of the human head at maximum extension anatomical postures, and/or eye positions of the human head at maximum left and right rotation anatomical postures. The multicamera device may comprise at least three cameras, the cameras being disposed such that their optical axes in the direction of the respective camera's field of view fall within a hemispheric field of view, the multicamera device comprising no cameras having their optical axes outside the hemispheric field of view, and the multicamera device having a total field of view covering a full sphere.

The multicamera device described here may have cameras with wide-angle lenses. The multicamera device may be suitable for creating stereo viewing image data, comprising a plurality of video sequences for the plurality of cameras. The multicamera may be such that any pair of cameras of the at least three cameras has a parallax corresponding to parallax (disparity) of human eyes for creating a stereo image. At least three cameras may have overlapping fields of view such that an overlap region for which every part is captured by said at least tree cameras is defined, and such overlap area can be used in forming the image for stereo viewing.

Figure 1:
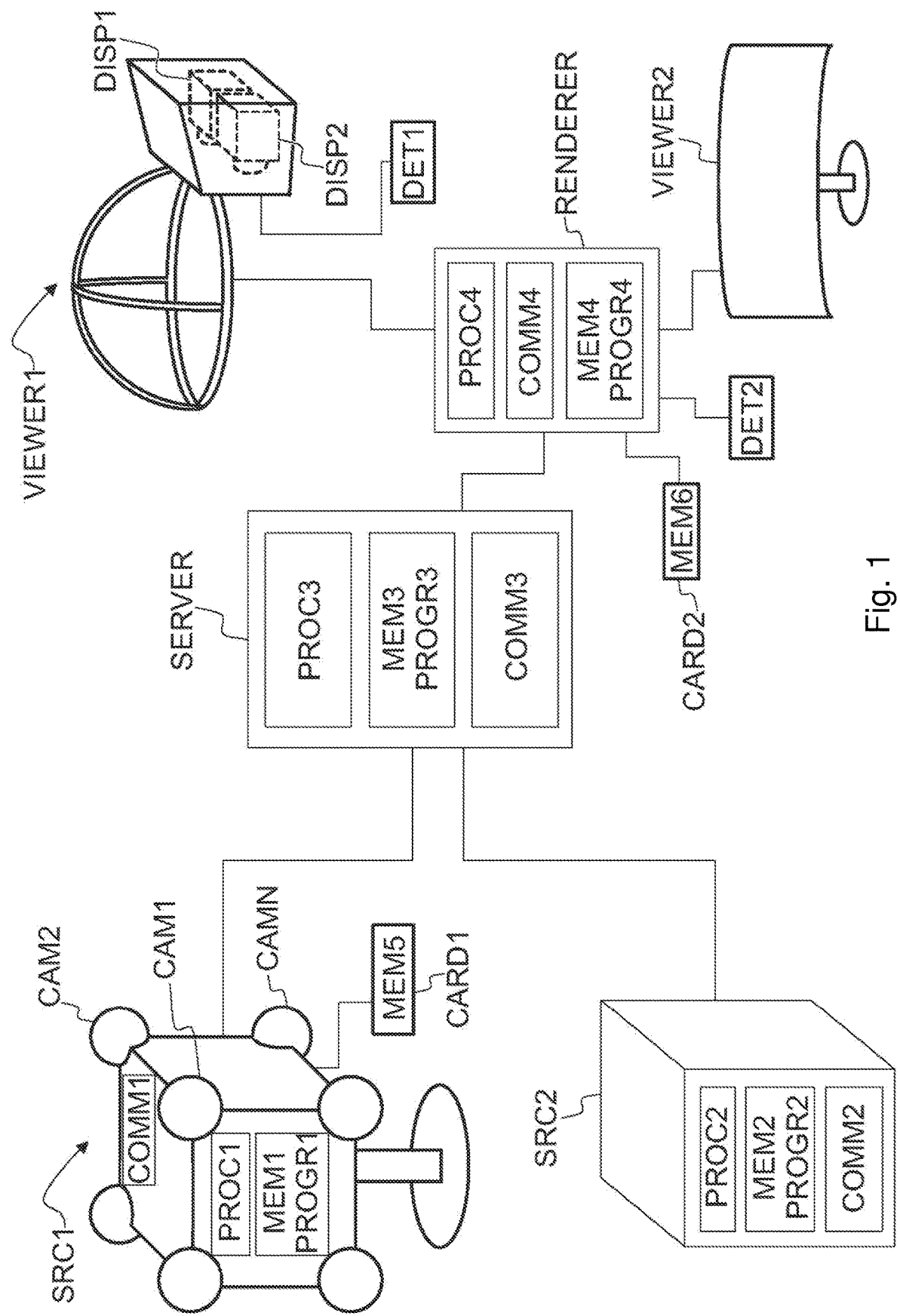
FIG. 1 shows a system and apparatuses for stereo viewing.

FIG. 1 shows a system and apparatuses for stereo viewing, that is, for 3D video and 3D audio digital capture and playback. The task of the system is that of capturing sufficient visual and auditory information from a specific location such that a convincing reproduction of the experience, or presence, of being in that location can be achieved by one or more viewers physically located in different locations and optionally at a time later in the future. Such reproduction requires more information that can be captured by a single camera or microphone, in order that a viewer can determine the distance and location of objects within the scene using their eyes and their ears. To create a pair of images with disparity, two camera sources are used. In a similar manner, for the human auditory system to be able to sense the direction of sound, at least two microphones are used (the commonly known stereo sound is created by recording two audio channels). The human auditory system can detect the cues, e.g. in timing difference of the audio signals to detect the direction of sound.

The system of FIG. 1 may consist of three main parts: image sources, a server and a rendering device. A video capture device SRC1 comprises multiple (for example, 8) cameras CAM1, CAM1, . . . , CAMN with overlapping field of view so that regions of the view around the video capture device is captured from at least two cameras. The device SRC1 may comprise multiple microphones to capture the timing and phase differences of audio originating from different directions. The device SRC1 may comprise a high resolution orientation sensor so that the orientation (direction of view) of the plurality of cameras can be detected and recorded. The device SRC1 comprises or is functionally connected to a computer processor PROC1 and memory MEM1, the memory comprising computer program PROGR1 code for controlling the video capture device. The image stream captured by the video capture device may be stored on a memory device MEM2 for use in another device, e.g. a viewer, and/or transmitted to a server using a communication interface COMM1. It needs to be understood that although an 8-camera-cubical setup is described here as part of the system, another multicamera device may be used instead as part of the system.

Alternatively or in addition to the video capture device SRC1 creating an image stream, or a plurality of such, one or more sources SRC2 of synthetic images may be present in the system. Such sources of synthetic images may use a computer model of a virtual world to compute the various image streams it transmits. For example, the source SRC2 may compute N video streams corresponding to N virtual cameras located at a virtual viewing position. When such a synthetic set of video streams is used for viewing, the viewer may see a three-dimensional virtual world. The device SRC2 comprises or is functionally connected to a computer processor PROC2 and memory MEM2, the memory comprising computer program PROGR2 code for controlling the synthetic sources device SRC2. The image stream captured by the device may be stored on a memory device MEM5 (e.g. memory card CARD1) for use in another device, e.g. a viewer, or transmitted to a server or the viewer using a communication interface COMM2.

There may be a storage, processing and data stream serving network in addition to the capture device SRC1. For example, there may be a server SERVER or a plurality of servers storing the output from the capture device SRC1 or computation device SRC2. The device SERVER comprises or is functionally connected to a computer processor PROC3 and memory MEM3, the memory comprising computer program PROGR3 code for controlling the server. The device SERVER may be connected by a wired or wireless network connection, or both, to sources SRC1 and/or SRC2, as well as the viewer devices VIEWER1 and VIEWER2 over the communication interface COMM3.

For viewing the captured or created video content, there may be one or more viewer devices VIEWER1 and VIEWER2. These devices may have a rendering module and a display module, or these functionalities may be combined in a single device. The devices may comprise or be functionally connected to a computer processor PROC4 and memory MEM4, the memory comprising computer program PROG4 code for controlling the viewing devices. The viewer (playback) devices may consist of a data stream receiver for receiving a video data stream from a server and for decoding the video data stream. The data stream may be received over a network connection through communications interface COMM4, or from a memory device MEM6 like a memory card CARD2. The viewer devices may have a graphics processing unit for processing of the data to a suitable format for viewing. The viewer VIEWER1 comprises a high-resolution stereo-image head-mounted display for viewing the rendered stereo video sequence. The head-mounted display may have an orientation sensor DET1 and stereo audio headphones. The viewer VIEWER2 comprises a display enable with 3D technology (for displaying stereo video), and the rendering device may have a head-orientation detector DET2 connected to it. Any of the devices (SRC1, SRC2, SERVER, RENDERER, VIEWER1, VIEWER2) may be a computer or a portable computing device, or be connected to such. Such rendering devices may have computer program code for carrying out methods according to various examples described in this text.

Figure 2A:
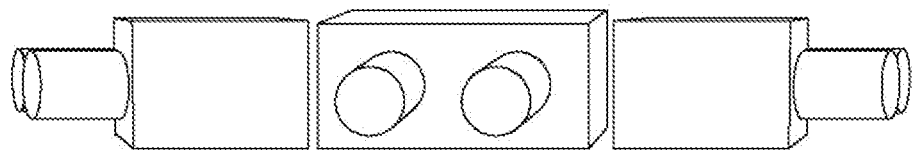
FIG. 2a shows a camera device for stereo viewing.

FIG. 2a shows a camera device for stereo viewing. The camera comprises three or more cameras that are configured into camera pairs for creating the left and right eye images, or that can be arranged to such pairs. The distances between cameras may correspond to the usual (or average) distance between the human eyes. The cameras may be arranged so that they have significant overlap in their field-of-view. For example, wide-angel lenses of 180-degrees or more may be used, and there may be 3, 4, 5, 6, 7, 8, 9, 10, 12, 16, or 20 cameras. The cameras may be regularly or irregularly spaced access the whole sphere of view, or they may cover only part of the whole sphere. For example, there may be three cameras arranged in a triangle and having different directions of view towards one side of the triangle such that all three cameras cover an overlap area in the middle of the directions of view. As another example, 8 cameras having wide-angle lenses and arranged regularly at the corners of a virtual cube and covering the whole sphere such that the whole or essentially whole sphere is covered at all directions by at least 3 or 4 cameras. In FIG. 2a three stereo camera pairs are shown.

Multicamera devices with other types of camera layouts may be used. For example, a camera device with all cameras in one hemisphere may be used. The number of cameras may be e.g., 3, 4, 6, 8, 12, or more. The cameras may be placed to create a central field of view where stereo images can be formed from image data of two or more cameras, and a peripheral (extreme) field of view where one camera covers the scene and only a normal non-stereo image can be formed.

Figure 2B:
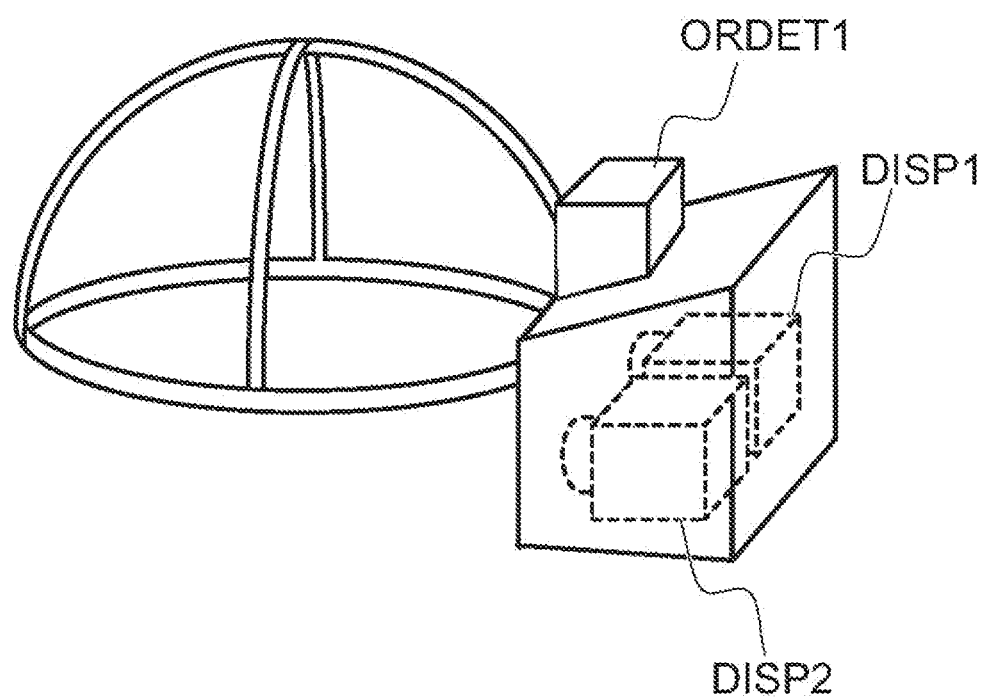
FIG. 2b shows a head-mounted display for stereo viewing.

FIG. 2b shows a head-mounted display for stereo viewing. The head-mounted display comprises two screen sections or two screens DISP1 and DISP2 for displaying the left and right eye images. The displays are close to the eyes, and therefore lenses are used to make the images easily viewable and for spreading the images to cover as much as possible of the eyes' field of view. The device is attached to the head of the user so that it stays in place even when the user turns his head. The device may have an orientation detecting module ORDET1 for determining the head movements and direction of the head. The head-mounted display gives a three-dimensional (3D) perception of the recorded/streamed content to a user.

Figure 3:
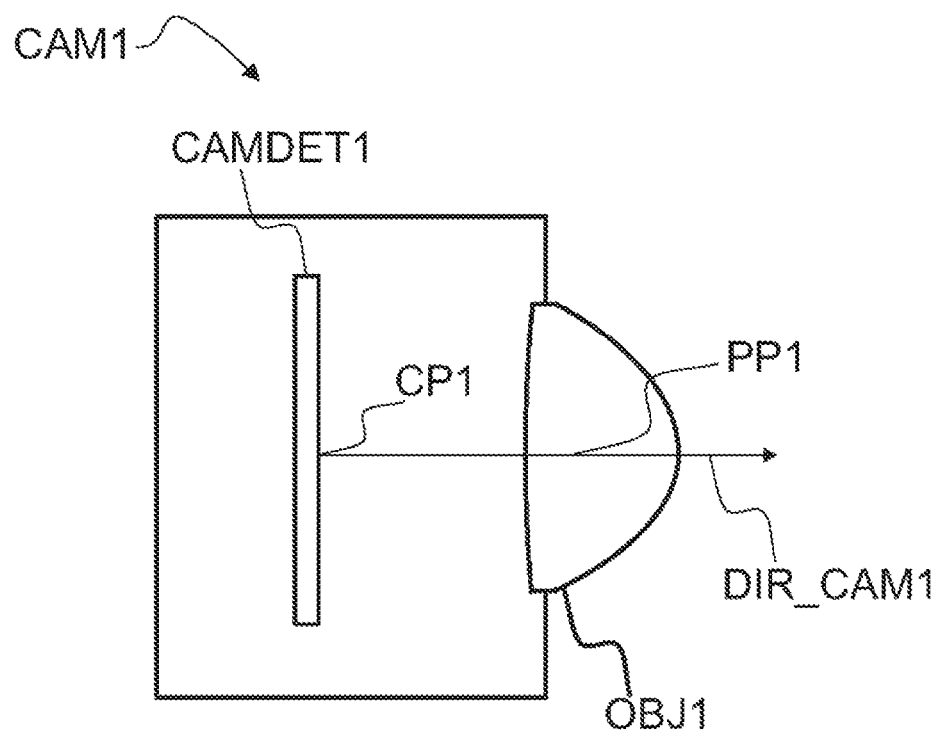
FIG. 3 shows a camera according to an embodiment.

FIG. 3 illustrates a camera CAM1. The camera has a camera detector CAMDET1, comprising a plurality of sensor elements for sensing intensity of the light hitting the sensor element. The camera has a lens OBJ1 (or a lens arrangement of a plurality of lenses), the lens being positioned so that the light hitting the sensor elements travels through the lens to the sensor elements. The camera detector CAMDET1 has a nominal center point CP1 that is a middle point of the plurality of sensor elements, for example for a rectangular sensor the crossing point of the diagonals. The lens has a nominal center point PP1, as well, lying for example on the axis of symmetry of the lens. The direction of orientation of the camera is defined by the line passing through the center point CP1 of the camera sensor and the center point PP1 of the lens. The direction of the camera is a vector along this line pointing in the direction from the camera sensor to the lens. The optical axis of the camera is understood to be this line CP1-PP1.

The system described above may function as follows. Time-synchronized video, audio and orientation data is first recorded with the capture device. This can consists of multiple concurrent video and audio streams as described above. These are then transmitted immediately or later to the storage and processing network for processing and conversion into a format suitable for subsequent delivery to playback devices. The conversion can involve post-processing steps to the audio and video data in order to improve the quality and/or reduce the quantity of the data while preserving the quality at a desired level. Finally, each playback device receives a stream of the data from the network, and renders it into a stereo viewing reproduction of the original location which can be experienced by a user with the head-mounted display and headphones.

In the following a method for creating stereo images is described. With the method, the user may be able to turn their head in multiple directions, and the playback device is able to create a high-frequency (e.g. 60 frames per second) stereo video and audio view of the scene corresponding to that specific orientation as it would have appeared from the location of the original recording. Other methods of creating the stereo images for viewing from the camera data may be used as well.

Figure 4A:
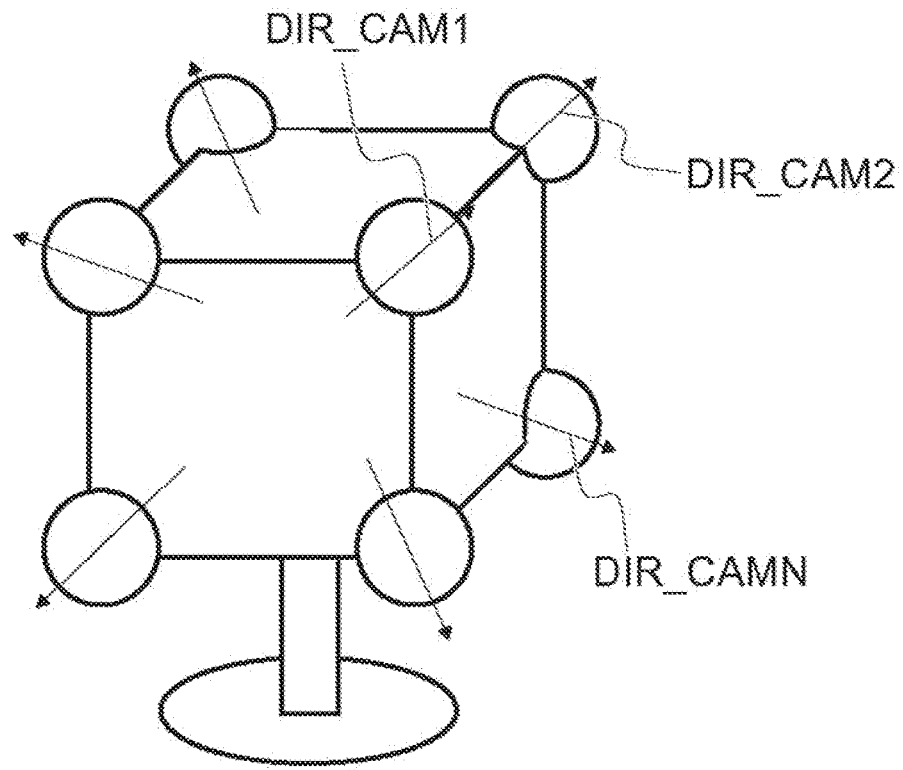
FIG. 4a, b show examples of a multicamera device.
Figure 4B:
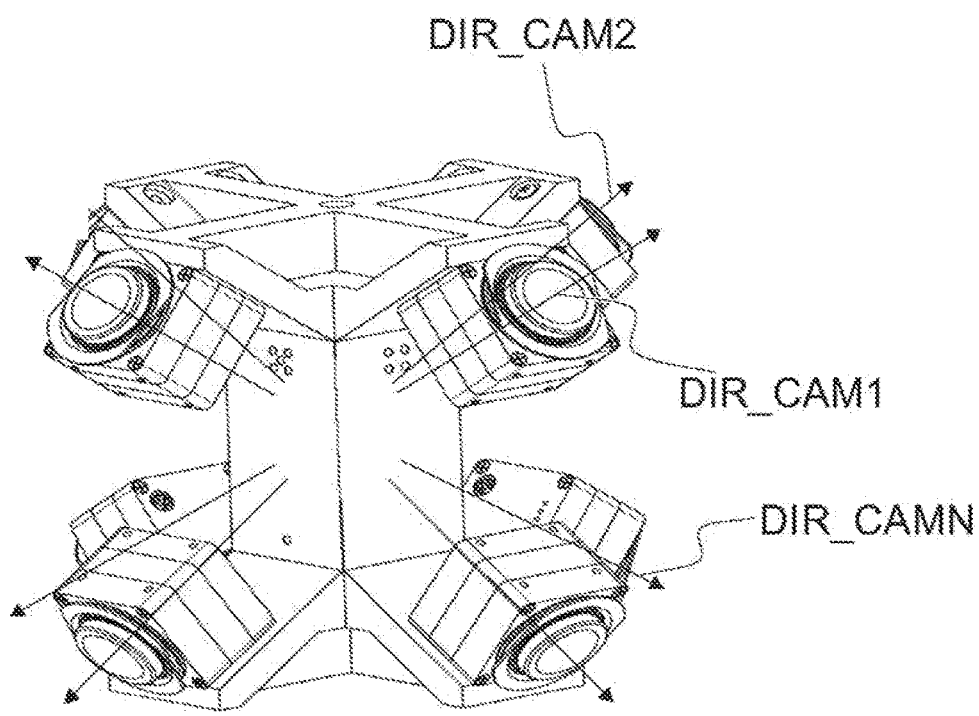

FIGS. 4a and 4b show an example of a camera device for being used as an image source. To create a full 360 degree stereo video panorama every direction of view needs to be photographed from two locations, one for the left eye and one for the right eye. In case of video panorama, these images need to be shot simultaneously to keep the eyes in sync with each other. As one camera cannot physically cover the whole 360 degree view, at least without being obscured by another camera, there need to be multiple cameras to form the whole 360 degree panorama. Additional cameras however increase the cost and size of the system and add more data streams to be processed. This problem becomes even more significant when mounting cameras on a sphere or platonic solid shaped arrangement to get more vertical field of view. However, even by arranging multiple camera pairs on for example a sphere or platonic solid such as octahedron or dodecahedron, the camera pairs will not achieve free angle parallax between the eye views. The parallax between eyes is fixed to the positions of the individual cameras in a pair, that is, in the perpendicular direction to the camera pair, no parallax can be achieved. This is problematic when the stereo content is viewed with a head mounted display that allows free rotation of the viewing angle around z-axis as well.

The requirement for multiple cameras covering every point around the capture device twice would require a very large number of cameras in the capture device. In this technique lenses are used with a field of view of 180 degree (hemisphere) or greater, and the cameras are arranged with a carefully selected arrangement around the capture device. Such an arrangement is shown in FIG. 4a, where the cameras have been positioned at the corners of a virtual cube, having orientations DIR_CAM1, DIR_CAM2, . . . , DIR_CAMN pointing away from the center point of the cube. Naturally, other shapes, e.g. the shape of a cuboctahedron, or other arrangement, even irregular ones, can be used.

Overlapping super wide field of view lenses may be used so that a camera can serve both as the left eye view of a camera pair and as the right eye view of another camera pair. This reduces the amount of needed cameras to half. As a surprising advantage, reducing the number of cameras in this manner increases the stereo viewing quality, because it also allows to pick the left eye and right eye cameras arbitrarily among all the cameras as long as they have enough overlapping view with each other. Using this technique with different number of cameras and different camera arrangements such as sphere and platonic solids enables picking the closest matching camera for each eye achieving also vertical parallax between the eyes. This is beneficial especially when the content is viewed using head mounted display. The described camera setup may allow creating stereo viewing with higher fidelity and smaller expenses of the camera device.

The present embodiments relate to multicamera system, where part of data captured by the multicamera system may be degraded in order to reduce the amount of data being broadcasted without sacrificing the quality of experience. The multicamera view quality degradation is based on the most probable viewing direction (MPVD), which is determined e.g. by means of eye tracking. The method according to embodiment comprises finding a location of MPVD on all available views and defining a central location for each view (having a specific shape and size). Further, the views which better cover the MPVD are selected and they are encoded with a higher quality, while the rest of the views may be encoded with lower quality.

In the related technology, video compression may be achieved by removing spatial frequency and temporal redundancies. Different types of prediction and quantization of transform-domain prediction residuals are jointly used in many video coding standards to exploit both spatial and temporal redundancies. In addition, as coding schemes have a practical limit in the redundancy that can be removed, spatial and temporal sampling frequency as well as the bit depth of samples can be removed, spatial and temporal sampling frequency as well as the bit depth of samples can be selected in such a manner that the subjective quality is degraded as little as possible.

One branch of research for obtaining compression improvement in stereoscopic video is known as asymmetric stereoscopic video coding, in which there is a quality difference between the two coded views. This is attributed to the widely believed assumption of the binocular suppression theory that the Human Visual System (HVS) fuses the stereoscopic image pair such that the perceived quality is close to that of the higher quality view.

Asymmetry between the two views can be achieved by one or more of the following methods:
    a) Mixed-resolution (MR) stereoscopic video coding, also referred to as resolution-asymmetric stereoscopic video coding. One of the views is low-pass filtered and hence has a smaller amount of spatial details or a lower spatial resolution. Furthermore, the low-pass filtered view is usually sampled with a coarser sampling grid, i.e., represented by fewer pixels.

b) Mixed-resolution chroma sampling. The chroma pictures of one view are represented by fewer samples than the respective chroma pictures of the other view.

c) Asymmetric sample-domain quantization. The sample values of the two views are quantized with a different step size. For example, the luma samples of one view may be represented with the range of 0 to 255 (i.e., 8 bits per sample) while the range may be scaled to the range of 0 to 159 for the second view. Thanks to fewer quantization steps, the second view can be compressed with a higher ratio compared to the first view. Different quantization step sizes may be used for luma and chroma samples. As a special case of asymmetric sample-domain quantization, one can refer to bit-depth-asymmetric stereoscopic video when the number of quantization steps in each view matches a power of two.

d) Asymmetric transform-domain quantization. The transform coefficients of the two views are quantized with a difference step size. As a result, one of the views has a lower fidelity and may be subject to a greater amount of visible coding artifacts, such as blocking and ringing.

e) A combination of different encoding techniques above.

Figure 5:
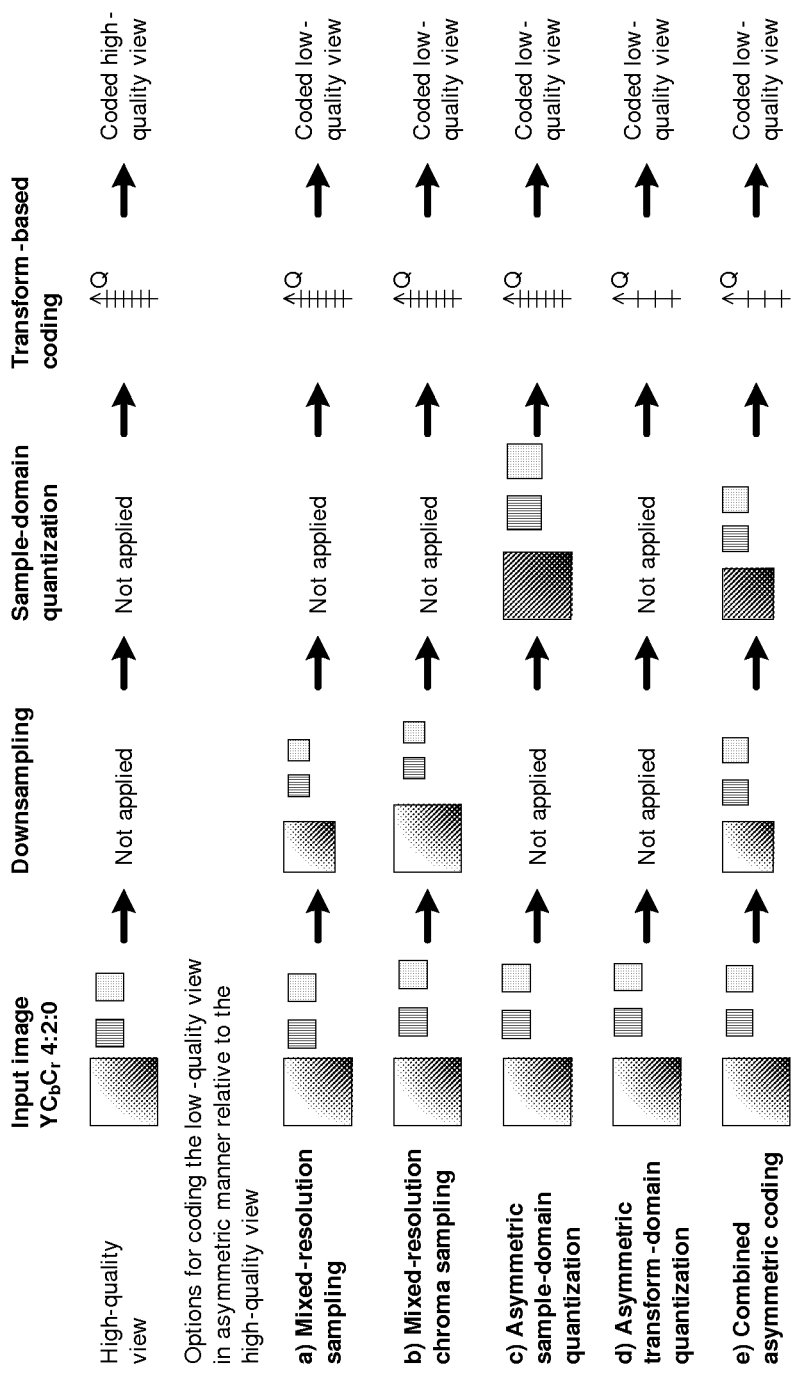
FIG. 5 shows examples of asymmetric stereoscopic coding of related technology.

The aforementioned types of asymmetric stereoscopic video coding are illustrated in FIG. 5. The first row presents the higher quality view 510 which is only transform-coded. The remaining rows present several encoding combinations which have been investigated to create the lower quality view using different steps, namely, downsampling, sample domain quantization, and transform-based coding. It can be observed from the FIG. 5 that downsampling or sample-domain quantization can be applied or skipped regardless of how other steps in the processing chain are applied. Likewise, the quantization step in the transform-domain coding step can be selected independently of the other steps. Thus, practical realizations of asymmetric stereoscopic video coding may use appropriate techniques for achieving asymmetry in a combined manner as illustrated in FIG. 5 (item e).

In addition to the aforementioned types of asymmetric stereoscopic video coding, mixed temporal resolution (i.e. different picture rate) between views has been proposed.

When texture views are low-pass filtered (LPF), the target is in removing the high-frequency components (HFCs) while keeping the spatial resolution and general structure of the image untouched. This enables the compression of the same content with reduced number of bits since less detail (high frequency components) need to be encoded. In the case where videos are presented in polarized displays, a downsampling with ration ½ along the vertical direction is applied to the content. This is because the vertical spatial resolution of the display is divided between the left and right view and hence, each one has half the vertical resolution. In such cases, depending on the display and content, a huge aliasing artifact might be introduced while perceiving the stereoscopic content. However, applying LPF reduces such artifact considerably since the high frequency components responsible for the creation of aliasing are removed in a pre-processing stage.

The present embodiments are discussed in more detailed with reference to a multicamera system including more than two cameras capturing the surrounding area at the same time. In a multicamera system, different cameras cover different areas of the scene simultaneously. However, the importance of the scene may differ from time to time. The multicamera system may have the highest quality for all capturing directions. However, the amount of data to be encoded and streamed for the more than two views, e.g. eight views, is much higher than the current available broadcasting infrastructure. Therefore, the amount of transmitted data should be decreased without sacrificing the quality of the experience. This will help multicamera system to enable broadcasting the content being captured with multicamera system with less required storage capacity.

The present embodiments propose to decrease the amount of data transmitted to represent the same data by decreasing the quality of the some or all of the views which are not expected to be perceived by the user (in a Multiview scenario perceived on HMDs). The method according to an embodiment is targeted to content captured with a multicamera system including more than one (e.g., eight) views. The method according to embodiment is shown in FIG. 6. Such method comprises determining the most probable viewing direction (MPVD) 610; finding the location of MPVD on all available views 620; defining a central location for each view (having a specific shape and size) 630; selecting 640 the views which better cover the MPVD; and encoding 650 the selected views with a higher quality, and encoding 660 the rest of the views with lower quality. There are several methods in related technology to choose the most probable viewing direction (pointing to a region of interest (ROI) or a specific event in the captured content), e.g. based on subjects head movement/eye gaze direction (averaged over several subjects watching the same content); based on the amount of movement in the scene (the pixel with highest spatial location movement along a specific period of time or a specific number of frames, e.g. on GOP); based on the depth information and closeness of the pixels to the viewer; provided by the content provider and alongside the content; a combination of any of the aforementioned. The related technology also comprises several audio/video methods to direct the user to along the MPVD while having the head-mounted display (HMD) on e.g. making a sound in a specific direction, adding augmented content to direct viewers towards that MPVD.

Eye gaze tracking is a process of measuring either the point of gaze (where one is looking) or the motion of an eye relative to the head. An eye gaze tracker is a device for measuring eye positions and eye movement and to follow the movement of eye's pupil to figure out exactly to which point the user is looking at. Eye gaze trackers are used in research on the visual systems and subjective tests enabling researches to follow the eye movement of users considering different content presented. Eye gaze can for example be tracked using a camera tracking the movement of pupil in user's eye. The process can be done in real time and with a relatively low processing and resources required. This has been discussed by Qiang Ji, et al. in "Real-time eye, gaze and face pose tracking for monitoring driver vigilance" (2002). The eye gaze can also be predicted based on the characteristics of the content as discussed by Laurent in "Automatic foveation for video compression using a neurobiological model of visual attention" (2004). The process requires a considerable amount of operations per pixel and hence, in most of the handheld devices cannot be utilized due to extensive power consumption. The eye gaze is expected to define the direction towards the most probable viewing part of the scene. Therefore, it is assumed that majority of the viewers may select to watch towards this direction or in a very close vicinity of that.

FIGS. 7a and 7b illustrate two examples of an object in multicamera content capturing setup. In FIG. 7a, the object 710 is in the left part of the scene in the horizontal direction and in the center of the vertical direction, considering the capturing direction of the multicamera system. Hence, it is not visible in the right hand view and mostly presented in the center of the image. This shows that a certain point of view can be visible in several different views. In FIG. 7b, the object 720 is located in central horizontal part of the scene more leaned towards the bottom in the vertical direction, considering the capturing direction of the multicamera system. Hence, it is not visible in the upper views. If there are objects introduced as the important part of the image, then the MPVD is configured to point to the center of the presented objects. Such center location may be defined as a pixel where average distance to all pixel locations belonging to the said object is minimum. In this scenario, the object may be completely or partially visible in different views too.

Figure 8:
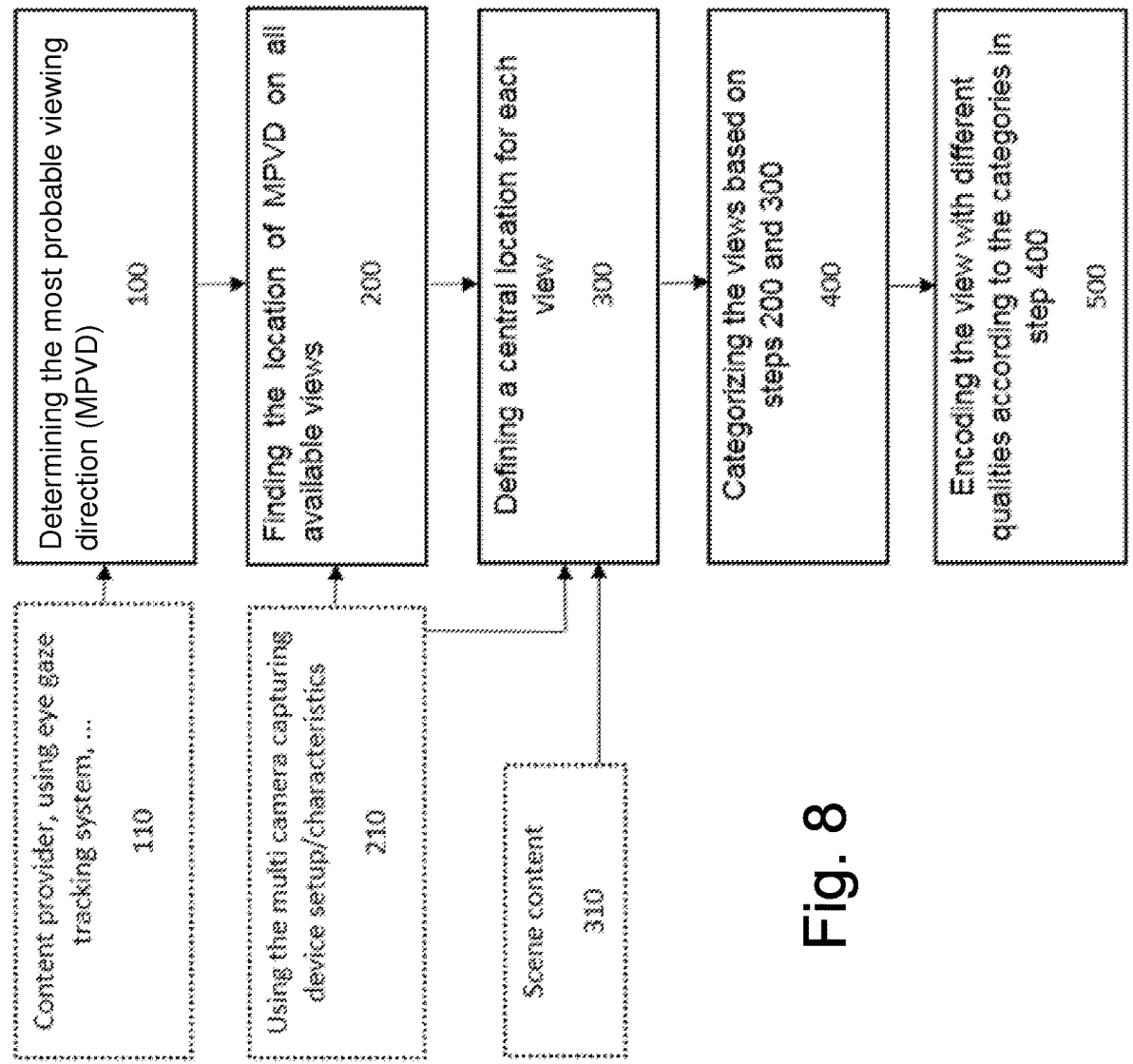
FIG. 8 shows a method according to another embodiment.

FIG. 8 illustrates a high level block diagram of a method according to an embodiment.

In step 100, the MPVD is determined. The MPVD shows the direction where the main event of the scene is expected to happen, and it is assumed that the users pay their attention mostly to this part of the scene. The MPVD can be obtained 110 by any known method from related technology. For example, such methods include, but are not limited to the following: 1) Head movement and eye gaze tracker. Where same content is perceived by several subjects, the head movement and tracked eye gaze of them is averaged to find the MPVD; 2) MPVD is provided by the content provider (wherein the users are directed to the main events in the scene to ensure that the important part of the content is well perceived by the users); 3) MPVD is indicated based on the amount of movement in the scene (the pixel with highest spatial location movement along a specific period of time or a specific number of frames, e.g. on group of pictures (GOP)); 4) Based on the depth information and closeness of the pixels to the viewer (e.g. if most parts of the image are relatively far from the user and only a small part is very close, the part that is close may be considered to present the MPVD); 5) Any combination of the aforementioned solutions.

Sometimes, the user may miss the main event of the scene as the content proposes a 360 degree presentation. However, there are several approaches that can direct the user towards the MPVD such as: Augmented signs on the display directing the user towards the direction of MPVD; Audio coming in a surrounding presentation from the location of MPVD or directing the user towards that direction; a vibration or any other type of physical movement indicator on the potential HMD or glasses that are being used by the user. Therefore, the user is expected to notice such indicators and hence, look at the direction of MPVD.

In step 200, the location of MPVD is tried to be found on all available views, and the MPVD is mapped to a spatial location on different views. By this, it is determined how (if at all) the MPVD is seen from different points of views as shown in FIGS. 7a and 7b. The multicamera system may have several setup and configuration parameters which are configured to perform such mapping. Therefore, the characteristics of the infrastructure capturing the content may be taken into account 210 to calculate the location of the MPVD from the point of view of different cameras. Such parameters may include the following: camera intrinsic and extrinsic parameters, their relative physical location and direction, viewing angle coverage, and number of cameras.

Figure 9:
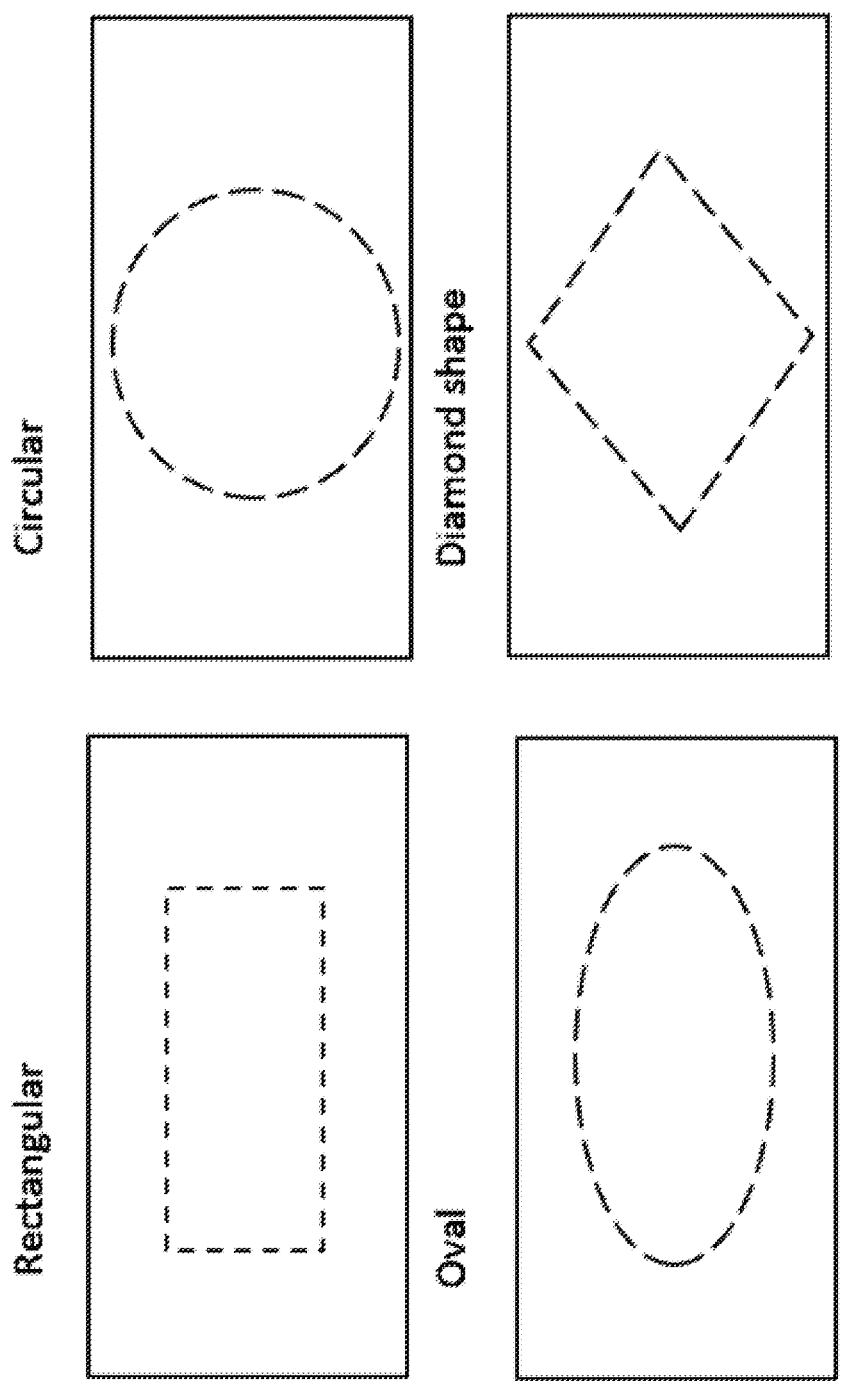
FIG. 9 shows examples of different shapes of central locations.

In step 300 a central location for each view may be defined. The central location can be visually marked (as shown in FIG. 9), e.g. as circular shape, rectangular shape, oval shape or diamond shape. Spatial location selection of different central locations (shape and size of them) depends on: multicamera system's capturing content setup (the larger the distance is between cameras, the larger area shall be allocated as central part of the views) (step 210); captured content, e.g. in a case of a football match, the central location may be rectangular to match the shape of the view (step 310); the size of the central locations may also depend on how much each view is covered in the adjacent views. The more overlap there is between the views, the smaller the central location shall be. Moreover, the size of the central locations may depend on the required or targeted bitrate reduction. The higher bitrate reduction is required, the smaller the central locations shall be.

Figure 10:
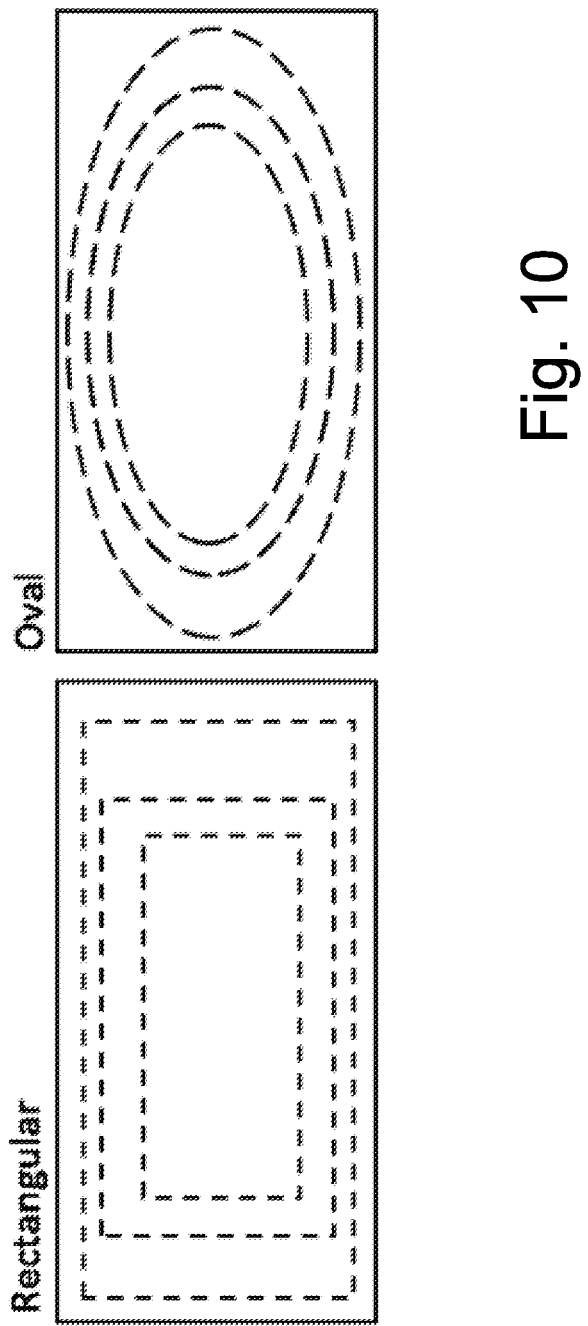
FIG. 10 shows a layered presentation of a central location.

It is also possible to have different layers of central location as show in FIG. 10. This may be used in step 410 (FIG. 8), where selection of views is considered, as the qualities can differ based on the location of MPVD considering these layers. This will also contribute positively to smooth the transition between the highest quality and lowest quality ensuring that the user does not perceive any quality degradation in the scene. Moreover, several layers help controlling the required amount of bitrate better to encode the same content because more tuning parameters are available for encoding different layers and hence, the bitrate adjustment can be performed with a better granularity. It should be noted that the shape of the different layers of the central locations can differ so that e.g. the central layer has a circular shape and the farther central location has a rectangular or oval shape.

The shape and size of the central locations may depend on how well the MPVD needs to be covered. If the intention is to keep the high quality as much as possible around the MPVD, the size of the shapes may cover a larger area on each view. On the other hand, if high compression ratio is the key constrain, then the size of the shapes may cover a smaller area on each view.

If the MPVD of a view is inside the central location, such view is considered to belong to a category associated with the highest quality (least compression applied and hence, least coding performance) in step 400. If the layered central locations are defined as shown in FIG. 10, then different categories will be defined. Such different categories are associated to different encoding strengths depending on the layer that MPVD belongs to (the closer to the central layer the MPVD is, then the lighter is the compression (i.e. less compression resulting in higher subjective quality), while going farther from center then the stronger is the compression (i.e. more compression resulting in a lower subjective quality). This also gives a flexibility to cover bigger/smaller surroundings around the MPVD location, which means that by covering larger central layers, larger objects will be covered in the respective views. The size, shape, and number of different layers not only depend on the location of MPVD on that view, but also on the size and shape of the potential object of interest as well as amount of required bitrate reduction.

Figure 11:
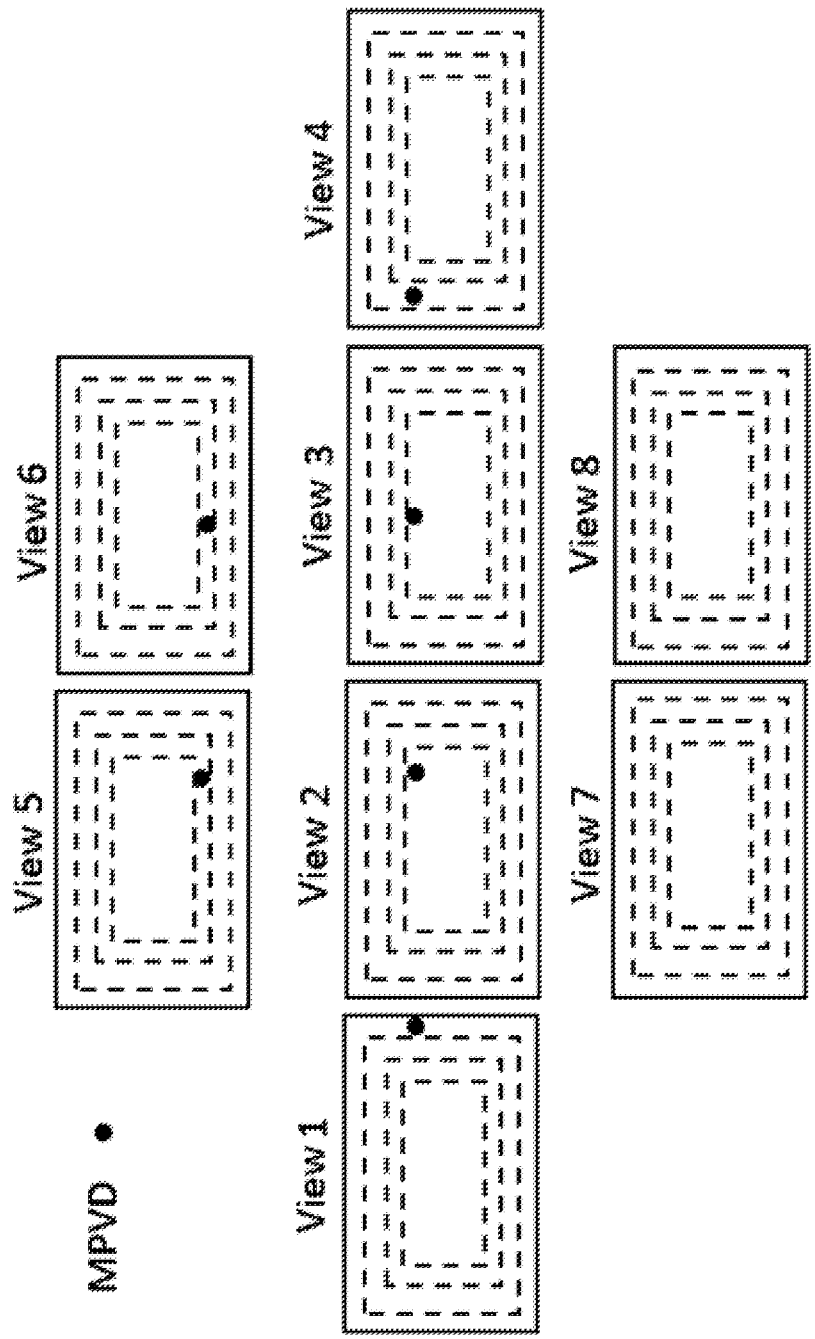
FIG. 11 shows examples of coding quality selection based on the most probable viewing direction.

In step 500 (FIG. 8), the encoding is applied based on the categories defined in step 400. FIG. 11 shows an example including: 1) different layers of central location; 2) MPVD; and 3) coding strengths. In the example of FIG. 11, the views 2 and 3, are classified to Quality 1, since the MPVD falls inside the innermost rectangle. Views 5 and 6 are classified to Quality 2, since the MPVD falls between the innermost rectangle and the middle rectangle. View 4 is categorized to Quality 3, because MPVD falls between the middle rectangle and the outermost rectangle. View 1 is categorized to Quality 4, because MPVD falls outside the outermost rectangle. Views 7 and 8 are categorized to Quality 5, because the MPVD is not present in these views. It is appreciated that in this example, the encoding qualities are defined so that Quality 1≥Quality 2≥Quality 3≥Quality 4>Quality 5. The lower quality in views can be achieved by e.g. low pass filtering prior to encoding; larger quantization parameter; sample value quantization; lower spatial resolution; or any combination of aforementioned.

In previous, a method according to an embodiment was discussed with various examples. An apparatus according to an embodiment comprises means for implementing the method, i.e. means for determining the most probable viewing direction (MPVD); means for finding the location of MPVD on all available views; means for defining a central location for each view (having a specific shape and size); means for selecting the views which better cover the MPVD; and means for encoding the selected views with a higher quality, and means for encoding the rest of the views with lower quality. The means comprises a processor, a memory, and a computer program code residing in the memory.

The various embodiments may provide advantages. For example, the present embodiments considerably decrease the required bitrate for encoding the more than one views targeted to broadcasting, e.g. if the MPVD is only visible in two extreme left views, then those are the only ones with higher quality and the other e.g. six views will be encoded with a lower quality which may considerably reduce the bitrate.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. A method comprising:
   determining a most probable viewing direction in a content, the most probable viewing direction being a direction toward a region of interest or specific event in the content;
   finding a location of the most probable viewing direction on all available views of the content;
   defining one or more central locations for available views;
   determining how the one or more central locations cover the most probable viewing direction on each available view; and
   based on determining how the one or more central locations cover the most probable viewing direction on each available view, applying encoding to the available views.

2. The method according to claim 1, further comprising: applying highest quality encoding to views where the central locations cover the most probable viewing direction the best.

3. The method according to claim 1, wherein the content is captured with a multi-camera device.

4. The method according to claim 1, further comprising:
   defining more than one central location for each view; and
   selecting one or more views based on a relative location of the most probable viewing direction and different central locations.

5. The method according to claim 3, wherein finding the location of the most probable viewing direction on different views is based on one or more of the following:
   extrinsic parameters of cameras of the multicamera device;
   intrinsic parameters of cameras of the multicamera device;
   physical location of cameras of the multicamera device;
   direction of cameras of the multicamera device;
   viewing angle coverage of cameras of the multicamera device; or
   number of cameras of the multicamera device.

6. The method according to claim 1, wherein the content is received through a communication network.

7. The method according to claim 1, wherein the most probable viewing direction is obtained by one or more of the following:
   determined by a head movement tracker;
   determined by an eye gaze tracker;
   received from a content provider;
   determined by an indication on the amount of movement in the content; or
   determined based on depth information and closeness of the pixels to a viewer.

8. The method according to claim 1, further comprising defining the central locations for each view by a certain shape of a certain size.

9. The method according to claim 8, further comprising selecting quality of the encoding based on the relationship of the most probable viewing direction and the central locations.

10. An apparatus comprising:
    at least one processor,
    at least one memory including computer program code, the at least one memory and the computer program code configured, with the at least one processor, to cause the apparatus to perform at least the following:

determine a most probable viewing direction in a content, the most probable viewing direction being a direction toward a region of interest or specific event in the content;

find a location of the most probable viewing direction on all available views of the content;

define one or more central locations for available views;

determine how the one or more central locations cover the most probable viewing direction on each available view; and based on determine how the one or more central locations cover the most probable viewing direction on each available view, apply encoding to the available views.

11. The apparatus according to claim 10, wherein the at least one memory and the computer program code are further configured, with the at least one processor, to apply highest quality encoding to views where the central locations cover the most probable viewing direction the best.

12. The apparatus according to claim 10, wherein the content is captured with a multi-camera device.

13. The apparatus according to claim 10, wherein the at least one memory and the computer program code are further configured, with the at least one processor, to define more than one central location for each view and select one or more views based on a relative location of the most probable viewing direction and different central locations.

14. The apparatus according to claim 12, wherein finding the location of the most probable viewing direction on different views is based on one or more of the following:
- extrinsic parameters of cameras of the multicamera device,
- intrinsic parameters of cameras of the multicamera device;
- physical location of cameras of the multicamera device;
- direction of cameras of the multicamera device;
- viewing angle coverage of cameras of the multicamera device; or
- number of cameras of the multicamera device.

15. The apparatus according to claim 10, wherein the content is received through a communication network.

16. The apparatus according to claim 10, wherein the most probable viewing direction is obtained by one or more of the following:
- determined by a head movement tracker;
- determined by an eye gaze tracker;
- received from a content provider;
- determined by an indication on the amount of movement in the content; or
- determined based on depth information and closeness of the pixels to a viewer.

17. The apparatus according to claim 10, wherein the at least one memory and the computer program code are further configured, with the at least one processor, to define the central locations for each view by a certain shape of a certain size.

18. The apparatus according to claim 17, wherein the at least one memory and the computer program code are further configured, with the at least one processor, to select quality of the encoding based on the relationship of the most probable viewing direction and the central locations.

19. A computer program product, embodied on a non-transitory computer readable medium, comprising computer program code configured, when executed on at least one processor, to cause an apparatus or a system to:

determine a most probable viewing direction in a content, the most probable viewing direction being a direction toward a region of interest or specific event in the content;

find a location of the most probable viewing direction on all available views of the content;

define one or more central locations for available views;

determine how the one or more central locations cover the most probable viewing direction on each available view; and based on determine how the one or more central locations cover the most probable viewing direction on each available view, apply encoding to the available views.

20. The computer program product according to claim 19, wherein the content is received through a communication network.

* * * * *